United States Patent
Burdette et al.

(10) Patent No.: US 10,691,730 B2
(45) Date of Patent: *Jun. 23, 2020

(54) METHOD, COMPUTER PROGRAM PRODUCT AND ELECTRONIC DEVICE FOR HYPER-LOCAL GEO-TARGETING

(71) Applicant: Digital Envoy, Inc., Norcross, GA (US)

(72) Inventors: Jeff Burdette, Norcross, GA (US); Joseph Hebenstreit, Roswell, GA (US); Richard Cabrera, Alpharetta, GA (US); Christopher Jason Lee, Alpharetta, GA (US); Robert Friedman, Decatur, GA (US); David Helsper, Marietta, GA (US)

(73) Assignee: Digital Envoy, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,722

(22) Filed: Mar. 25, 2013

(65) Prior Publication Data

US 2013/0227069 A1 Aug. 29, 2013

Related U.S. Application Data

(63) Continuation of application No. 12/616,366, filed on Nov. 11, 2009, now Pat. No. 8,443,107.

(51) Int. Cl.
  *G06F 16/29* (2019.01)
  *H04L 29/12* (2006.01)
  *H04L 29/08* (2006.01)

(52) U.S. Cl.
  CPC ........ *G06F 16/29* (2019.01); *H04L 29/12792* (2013.01); *H04L 61/60* (2013.01);
  (Continued)

(58) Field of Classification Search
  CPC ..... H04L 12/1831; H04L 41/12; H04L 41/24; H04L 41/26; H04L 51/28; H04L 67/18;
  (Continued)

(56) References Cited

U.S. PATENT DOCUMENTS 4,939,723 A 7/1990 Harley, Jr. et al.
4,939,726 A 7/1990 Flammer et al.
(Continued)

FOREIGN PATENT DOCUMENTS

AU 780066 B2 2/2005
CA 2372808 A1 11/2000
(Continued)

OTHER PUBLICATIONS

Buyukkoten, Orkut, et al., "Exploiting Geographical Location Information of Web Pages," Department of Computer Sciences, Stanford University, Stanford, CA 94305; pp. 1- 6. "Undated Reference, Applicant Submits as Prior Art".

(Continued)

*Primary Examiner* — Patrice L Winder
(74) *Attorney, Agent, or Firm* — Smith Gambrell & Russell LLP

(57) ABSTRACT

A method, computer program product and electronic device are provided for providing hyper-local geo-targeting based on validated, user-supplied geographic information, wherein the user's anonymity may be maintained. In particular, user-supplied geographic information may be collected in association with a truncated IP address. Once collected, the user-supplied information may be validated using geographic data previously derived from one or more complete IP addresses corresponding to the received truncated IP address. The derived geographic data may have been derived using a system that maps the routing infrastructure of the Internet in order to determine where endpoints on the
(Continued)

Internet are located. The validated, user-supplied geographic information, which may be more specific than the derived geographic data, may then be used to provide more granular and accurate geo-targeting, all the while maintaining the privacy of the individual users.

24 Claims, 4 Drawing Sheets

(52) U.S. Cl.
CPC ............ *H04L 61/609* (2013.01); *H04L 67/18* (2013.01); *H04L 67/20* (2013.01); *H04L 67/26* (2013.01)

(58) Field of Classification Search
CPC ............... H04L 29/12783; H04L 61/35; H04L 61/6068; H04L 61/609; H04L 67/22; H04L 61/60; H04L 29/12792; H04L 67/20; H04L 67/26; G06F 17/3087; G06F 17/30241; G06F 2221/2111; G06F 16/29
See application file for complete search history.

(56) References Cited

U.S. PATENT DOCUMENTS

| | | |
|---|---|---|
| 5,042,027 A | 8/1991 | Takahashi et al. |
| 5,042,032 A | 8/1991 | Dighe et al. |
| 5,115,433 A | 5/1992 | Baran et al. |
| 5,231,631 A | 7/1993 | Buhrke et al. |
| 5,291,550 A | 3/1994 | Levy et al. |
| 5,418,731 A | 5/1995 | Allen |
| 5,421,024 A | 5/1995 | Faulk, Jr. et al. |
| 5,459,863 A | 10/1995 | Taylor |
| 5,488,608 A | 1/1996 | Flammer, III |
| 5,490,252 A | 2/1996 | Macera et al. |
| 5,493,689 A | 2/1996 | Waclawsky et al. |
| 5,636,276 A | 6/1997 | Brugger |
| 5,659,596 A | 8/1997 | Dunn |
| 5,680,390 A | 10/1997 | Robrock, II |
| 5,734,651 A | 3/1998 | Blakeley et al. |
| 5,734,823 A | 3/1998 | Saigh et al. |
| 5,734,891 A | 3/1998 | Saigh |
| 5,774,668 A | 6/1998 | Choquier et al. |
| 5,777,989 A | 7/1998 | McGarvey |
| 5,794,217 A | 8/1998 | Allen |
| 5,812,865 A | 9/1998 | Theimer et al. |
| 5,857,191 A | 1/1999 | Blackwell et al. |
| 5,870,561 A | 2/1999 | Jarvis et al. |
| 5,878,126 A | 3/1999 | Velamuri et al. |
| 5,913,036 A | 6/1999 | DeMoss et al. |
| 5,920,697 A | 7/1999 | Masters et al. |
| 5,930,474 A | 7/1999 | Dunworth et al. |
| 5,937,163 A | 8/1999 | Lee et al. |
| 5,944,790 A | 8/1999 | Levy |
| 5,946,299 A | 8/1999 | Blonder |
| 5,948,061 A | 9/1999 | Merriman et al. |
| 5,958,052 A | 9/1999 | Bellovin et al. |
| 5,963,915 A | 10/1999 | Kirsch |
| 5,974,457 A | 10/1999 | Waclawsky et al. |
| 5,978,845 A | 11/1999 | Reisacher |
| 5,987,523 A | 11/1999 | Hind et al. |
| 6,009,081 A | 12/1999 | Wheeler et al. |
| 6,012,052 A | 1/2000 | Altschuler et al. |
| 6,012,088 A | 1/2000 | Li et al. |
| 6,012,090 A | 1/2000 | Chung et al. |
| 6,014,634 A | 1/2000 | Scroggie et al. |
| 6,035,332 A | 3/2000 | Ingrassia, Jr. et al. |
| 6,058,420 A | 5/2000 | Davies |
| 6,069,895 A | 5/2000 | Ayandeh |
| 6,069,939 A | 5/2000 | Fung et al. |
| 6,091,959 A | 7/2000 | Souissi et al. |
| 6,108,637 A | 8/2000 | Blumenau |
| 6,119,247 A | 9/2000 | House et al. |
| 6,128,664 A | 10/2000 | Yanagidate et al. |
| 6,130,890 A | 10/2000 | Leinwand et al. |
| 6,148,335 A | 11/2000 | Robinson et al. |
| 6,151,631 A | 11/2000 | Ansell et al. |
| 6,167,259 A | 12/2000 | Shah |
| 6,192,312 B1 | 2/2001 | Hummelsheim |
| 6,243,746 B1 | 6/2001 | Sondur et al. |
| 6,243,749 B1 | 6/2001 | Sitaraman et al. |
| 6,249,252 B1 | 6/2001 | Dupray |
| 6,249,813 B1 | 6/2001 | Campion et al. |
| 6,259,701 B1 | 7/2001 | Shur et al. |
| 6,266,607 B1 | 7/2001 | Meis et al. |
| 6,272,150 B1 | 8/2001 | Hraster et al. |
| 6,272,343 B1 | 8/2001 | Pon et al. |
| 6,285,660 B1 | 9/2001 | Ronen |
| 6,285,748 B1 | 9/2001 | Lewis |
| 6,286,047 B1 | 11/2001 | Ramanathan et al. |
| 6,317,761 B1 | 11/2001 | Landsman et al. |
| 6,324,585 B1 | 11/2001 | Zhang et al. |
| 6,327,677 B1 | 12/2001 | Garg et al. |
| 6,330,239 B1 | 12/2001 | Suzuki |
| 6,332,127 B1 | 12/2001 | Bandera et al. |
| 6,332,158 B1 | 12/2001 | Risley et al. |
| 6,343,290 B1 | 1/2002 | Cossins et al. |
| 6,345,303 B1 | 2/2002 | Knauerhase et al. |
| 6,347,078 B1 | 2/2002 | Narvaez-Guarnieri |
| 6,356,929 B1 | 3/2002 | Gall et al. |
| 6,374,302 B1 | 4/2002 | Galasso et al. |
| 6,377,961 B1 * | 4/2002 | Ryu ..................... G06F 17/3087 |
| 6,397,246 B1 | 5/2002 | Wolfe |
| 6,415,323 B1 | 7/2002 | McCanne et al. |
| 6,442,565 B1 | 8/2002 | Tyra et al. |
| 6,446,076 B1 | 9/2002 | Burkey et al. |
| 6,466,940 B1 | 10/2002 | Mills |
| 6,473,407 B1 | 10/2002 | Ditmer et al. |
| 6,477,150 B1 | 11/2002 | Maggenti et al. |
| 6,484,143 B1 | 11/2002 | Swildens et al. |
| 6,487,538 B1 | 11/2002 | Gupta et al. |
| 6,498,782 B1 | 12/2002 | Branstad et al. |
| 6,505,201 B1 | 1/2003 | Haitsuka et al. |
| 6,505,254 B1 | 1/2003 | Johnson et al. |
| 6,505,255 B1 | 1/2003 | Akatsu et al. |
| 6,513,061 B1 | 1/2003 | Ebata et al. |
| 6,516,192 B1 | 2/2003 | Spaur et al. |
| 6,529,475 B1 | 3/2003 | Wan |
| 6,529,491 B1 | 3/2003 | Chang et al. |
| 6,574,663 B1 | 3/2003 | Bakashi et al. |
| 6,542,739 B1 | 4/2003 | Garner |
| 6,570,974 B1 | 5/2003 | Gerszberg et al. |
| 6,571,279 B1 | 5/2003 | Herz et al. |
| 6,577,653 B1 | 6/2003 | Rochberger et al. |
| 6,578,066 B1 | 6/2003 | Logan et al. |
| 6,597,777 B1 | 7/2003 | Ho |
| 6,629,136 B1 | 9/2003 | Naidoo |
| 6,643,696 B2 | 11/2003 | Davis et al. |
| 6,665,715 B1 * | 12/2003 | Houri ..................... H04L 29/06 709/204 |
| 6,684,250 B2 | 1/2004 | Anderson et al. |
| 6,690,659 B1 * | 2/2004 | Ahmed et al. ................ 370/328 |
| 6,721,795 B1 | 4/2004 | Eldreth |
| 6,757,740 B1 * | 6/2004 | Parekh et al. ................ 709/245 |
| 6,778,524 B1 | 8/2004 | Augart |
| 6,826,617 B1 | 11/2004 | Ansell et al. |
| 6,928,485 B1 * | 8/2005 | Krishnamurthy ........................... G06F 17/30598 709/220 |
| 6,973,039 B2 | 12/2005 | Redi et al. |
| 6,996,084 B2 | 2/2006 | Troxel et al. |
| 7,039,689 B2 | 5/2006 | Martija et al. |
| 7,062,572 B1 | 6/2006 | Hampton |
| 7,072,963 B2 | 7/2006 | Anderson et al. |
| 7,100,204 B1 * | 8/2006 | Myllymaki ........... H04W 4/029 726/22 |
| 7,116,643 B2 | 10/2006 | Huang et al. |
| 7,139,820 B1 | 11/2006 | O'Toole et al. |
| 7,200,673 B1 * | 4/2007 | Augart ..................... H04L 41/12 709/223 |
| 7,260,085 B2 | 8/2007 | Dobbins et al. |
| 7,269,157 B2 | 9/2007 | Klinker et al. |

(56) References Cited

U.S. PATENT DOCUMENTS

| | | | |
|---|---|---|---|
| 7,296,088 B1* | 11/2007 | Padmanabhan | H04L 45/04 |
| | | | 709/238 |
| 7,298,327 B2 | 11/2007 | Dupray et al. | |
| 7,360,245 B1* | 4/2008 | Ramachandran | H04L 63/1466 |
| | | | 713/153 |
| 7,403,978 B2 | 7/2008 | Parekh et al. | |
| 7,451,233 B2 | 11/2008 | Parekh et al. | |
| 7,454,523 B2 | 11/2008 | Chow et al. | |
| 7,685,279 B2* | 3/2010 | Miltonberger | G07F 17/32 |
| | | | 370/242 |
| 7,698,377 B2 | 4/2010 | Parekh | |
| 7,801,950 B2* | 9/2010 | Eisenstadt | G06F 16/958 |
| | | | 709/203 |
| 7,844,729 B1 | 11/2010 | Friedman | |
| 7,937,383 B2* | 5/2011 | Hintze | G06F 16/00 |
| | | | 707/706 |
| 7,996,521 B2* | 8/2011 | Chamberlain | G06Q 30/0201 |
| | | | 705/14.49 |
| 8,060,606 B2 | 11/2011 | Friedman | |
| 8,204,833 B2* | 6/2012 | Mu | G06Q 20/3821 |
| | | | 705/76 |
| 8,280,624 B2* | 10/2012 | Riise | G06F 17/3087 |
| | | | 455/456.1 |
| 8,443,107 B2 | 5/2013 | Burdette et al. | |
| 8,490,004 B2* | 7/2013 | Shuster | G06Q 30/02 |
| | | | 715/760 |
| 8,788,321 B2* | 7/2014 | Lettow, Jr. | G06Q 30/0277 |
| | | | 705/14.43 |
| 8,825,683 B2* | 9/2014 | White | G06Q 30/02 |
| | | | 707/758 |
| 2001/0020242 A1 | 9/2001 | Gupta et al. | |
| 2002/0007374 A1 | 1/2002 | Marks et al. | |
| 2002/0042274 A1 | 4/2002 | Ades | |
| 2002/0131363 A1 | 9/2002 | Beshai et al. | |
| 2002/0143991 A1 | 10/2002 | Chow et al. | |
| 2002/0152311 A1 | 10/2002 | Veltman et al. | |
| 2002/0165980 A1 | 11/2002 | Brown | |
| 2002/0199018 A1* | 12/2002 | Diedrich et al. | 709/245 |
| 2003/0031178 A1 | 2/2003 | Haeri et al. | |
| 2003/0074471 A1* | 4/2003 | Anderson | H04L 29/12009 |
| | | | 709/245 |
| 2003/0086422 A1 | 5/2003 | Klinker et al. | |
| 2003/0090996 A1 | 5/2003 | Stewart | |
| 2003/0110293 A1 | 6/2003 | Friedman | |
| 2003/0172036 A1* | 9/2003 | Feigenbaum | G06Q 20/24 |
| | | | 705/64 |
| 2003/0187949 A1* | 10/2003 | Bhatt | H04L 67/22 |
| | | | 709/218 |
| 2004/0047287 A1* | 3/2004 | Tremblay | G06Q 30/02 |
| | | | 370/229 |
| 2004/0078489 A1 | 4/2004 | Anderson et al. | |
| 2004/0078490 A1 | 4/2004 | Anderson et al. | |
| 2004/0151129 A1 | 8/2004 | Kun-Szabo et al. | |
| 2004/0199623 A1 | 10/2004 | Houri | |
| 2005/0021853 A1 | 1/2005 | Parekh et al. | |
| 2005/0041675 A1 | 2/2005 | Trostle et al. | |
| 2005/0071417 A1* | 3/2005 | Taylor | G06Q 30/02 |
| | | | 709/200 |
| 2005/0190695 A1 | 9/2005 | Phaal | |
| 2005/0234922 A1 | 10/2005 | Parekh | |
| 2005/0251539 A1 | 11/2005 | Parekh | |
| 2005/0271038 A1 | 12/2005 | Xin et al. | |
| 2006/0056388 A1* | 3/2006 | Livingood | 370/352 |
| 2006/0080321 A1* | 4/2006 | Horn | G06F 17/30867 |
| 2006/0106944 A1* | 5/2006 | Shahine | G06Q 30/02 |
| | | | 709/245 |
| 2006/0128397 A1* | 6/2006 | Choti et al. | 455/456.1 |
| 2006/0146820 A1 | 7/2006 | Friedman | |
| 2006/0212601 A1 | 9/2006 | Hampton | |
| 2006/0224752 A1 | 10/2006 | Parekh | |
| 2007/0133385 A1* | 6/2007 | Hoek | G06F 17/3087 |
| | | | 370/201 |
| 2007/0136295 A1* | 6/2007 | Gorodyansky et al. | 707/10 |
| 2007/0202888 A1* | 8/2007 | Brachet | G01S 5/02 |
| | | | 455/456.1 |
| 2008/0037536 A1 | 2/2008 | Padmanabhan | |
| 2008/0065774 A1* | 3/2008 | Keeler | 709/227 |
| 2008/0113674 A1* | 5/2008 | Baig | G06Q 10/10 |
| | | | 455/456.3 |
| 2008/0123558 A1 | 5/2008 | Chhabra | |
| 2008/0250128 A1* | 10/2008 | Sargent | H04L 41/22 |
| | | | 709/223 |
| 2008/0275978 A1* | 11/2008 | Houri | 709/223 |
| 2009/0006211 A1* | 1/2009 | Perry | G06Q 30/02 |
| | | | 705/14.66 |
| 2009/0112703 A1 | 4/2009 | Brown | |
| 2009/0119394 A1* | 5/2009 | Winkler | H04L 41/12 |
| | | | 709/223 |
| 2009/0132559 A1* | 5/2009 | Chamberlain | G06Q 30/02 |
| 2009/0144411 A1* | 6/2009 | Winkler | H04L 41/12 |
| | | | 709/224 |
| 2009/0216720 A1* | 8/2009 | Piche et al. | 707/3 |
| 2010/0151816 A1* | 6/2010 | Besehanic et al. | 455/405 |
| 2010/0153525 A1 | 6/2010 | Parekh | |
| 2010/0211960 A1 | 8/2010 | Sirajuddin et al. | |
| 2011/0113116 A1 | 5/2011 | Burdette et al. | |
| 2013/0227069 A1 | 8/2013 | Burdette et al. | |

FOREIGN PATENT DOCUMENTS

| | | |
|---|---|---|
| EP | 1175767 A1 | 1/2002 |
| EP | 2 323 350 | 5/2011 |
| JP | 09-284341 | 10/1997 |
| JP | 2011-032080 | 2/1999 |
| JP | 3254422 | 1/2000 |
| JP | 2000- 201147 | 7/2000 |
| WO | WO 96/13108 | 5/1996 |
| WO | WO 99/34305 | 7/1999 |
| WO | WO 00/22495 | 4/2000 |
| WO | WO 00/67450 | 11/2000 |
| WO | WO 2001/022656 | 3/2001 |
| WO | WO 2001/057696 | 8/2001 |
| WO | WO 01/75632 | 10/2001 |
| WO | WO 02/13459 | 2/2002 |
| WO | WO 02/17139 A1 | 2/2002 |
| WO | WO 02/23807 | 3/2002 |
| WO | WO 2011/059862 | 5/2011 |

OTHER PUBLICATIONS

Cooney, R., "Subnet Addressing," Network Computing, by www.networkcomputing.com/unixworld,tutoria1/001.html, 7 pages, "Undated Reference, Applicant Submits as Prior Art".

"Digital Envoy Greets $1.1 Million," VC & Startups; http://www.redherring.com/vc/2000/0229vc-digitalenvov022900.hmtl; Feb. 29, 2000; 2 pages.

Digital Island "Content Delivery Services: Footprint™ Streaming Solutions;" Digital Island, San Francisco, CA 64105 USA; 6 pages; "Undated Reference, Applicant Submits as Prior Art".

Digital Island "TraceWare White Paper;" Digital Island San Francisco, CA 64105 USA; Jun. 1999; 8 pages.

Eastlake, D., "Doman Name System Security Extensions," Internet Engineering Task Force, Request for Comments 2535, 1999.

Gargano, et al., "Whois and Network Information Lookup Service," University of California, Davis, Aug. 1995, 7 pages.

Harrenstien, et al., "Nicname/Whois," Internet Engineering Task Force, Network Working Group. Request for Comments 954, Oct. 1985, 4 pages.

Kessler et al., "A Primer on Internet and TCP/I{ Tools and Utilities," Network Working Group; Request for Comments:2151; Hill Associates, Inc., Jun. 1997; 49 pages.

Lambert, John, "Subnet Masking Definition. What is subnet masking and what is it used for?" http://www.exabyte.net/lambert/subnet/subnet_masking_definition.htm; 1999-2004; 2 pages.

Lamm, et al., "Real Time Geographic Visualization of World Wide Web Traffic," WWW Journal Issue 3; 9 pages; "Undated Reference, Applicant Submits as Prior Art".

(56) References Cited

OTHER PUBLICATIONS

McCurley, Kevin S., "Geospatial Mapping and Navigation of the Web," IBM Almaden Research Center, San Jose, CA 95120; May 1-5, 2001; 12 pages.

Rousseau, et al., "GeoRoute: An Interactive Graphics System for Routing and Scheduling over Street Networks," IEEE, Sep. 1989; pp. 161-163.

Woolley, Scott, "We Know Where You Live," Forbes Magazine, Nov. 13, 2000; 2 pages.

Digital Element™, "NetAcuity Edge—Your "Edge" for Global Online Targeting," A Digital Element™ Product Sheet; 2 pages; "Undated Reference, Applicant Submits as Prior Art".

Digital Element™, "NetAcuity Edge, A New "Edge" for Global Online Targeting," 3 pages; Mar. 15, 2010.

Digital Element™ Press Releases, "Digital Element Brings a New "Edge" to Global Online Targeting," 3 pages; Jul. 28, 2009.

Imielinski, et al., "Geographic Addressing, Routing, and Resource Discovery with the Global Positioning System," Computer Science Department, Rutgers, The State University, Piscataway, New Jersey; Oct. 19, 1996; 10 pages.

Carton, Sean, "Geotargeting: Why it Matters to Marketers," ClickZ® Today; Apr. 7, 2003; 3 pages.

Digital Envoy ®, Technology Review, MIT's Magazine of Innovation, Names Sanjay Parekh one of the World's Top Young Innovators; Sep. 15, 2003; 2 pages.

MacVittie, Lori, "Coyote Point Emissary Uses Geolocating to Enhance Load-Balancing," Network Computing, Mar. 18, 2001 (1 page).

Moore, et al., "Where in the World is netgeo.caida.org?," Cooperative Association for Internet Data Analysis, Jul. 2000, 11 pages.

"Coyote Point Emissary," New Architect Magazine; Nov. 2002 1 page.

Parekh, Sanjay, "A Sensing of Place", Digital Envoy, found at http://www.e-insite.net/commvergemag/index.asp?layout=articlePrint&article ID; Jun. 1, 2001, 4 pages.

Economist.com Technology Quarterly, "The Revenge of Geography," Mar. 13, 2003, 7 pages.

The Patent Examination Report No. 1 issued by the Australian Patent Office dated Sep. 14, 2015; 2 pages.

The Office Action released by the Canadian Patent Office for Canadian Patent Application No. 2,777,844 dated Nov. 22, 2016, 3 pages.

* cited by examiner

METHOD, COMPUTER PROGRAM PRODUCT AND ELECTRONIC DEVICE FOR HYPER-LOCAL GEO-TARGETING

This application is a continuation of U.S. patent application Ser. No. 12/616,366 filed Nov. 11, 2009, which is incorporated by reference in its entirety as if fully set forth herein.

FIELD

Embodiments of the invention relate, generally, to geo-targeting and, in particular, to hyper-local IP targeting based on validated, user-provided geographic information.

BACKGROUND

The Internet consists of a network of interconnected computer networks. Each of these computers has an Internet Protocol (IP) address that is comprised of a series of four numbers (or octets) separated by periods or dots, wherein each of these four numbers is an 8-bit integer which collectively represent the unique address of the computer within the Internet. The Internet is a packet switching network whereby a data file routed over the Internet to some destination is broken down into a number of packets that are separately transmitted to the destination. Each packet contains, inter alia, some portion of the data file and the IP address of the destination.

The IP address of a destination is useful in routing packets to the correct destination, but it is not very people friendly. In particular, a group of four 8-bit numbers by themselves do not reveal or suggest anything about the destination, and most people would likely find it difficult to remember the IP addresses of a destination. As a result of this shortcoming in just using IP addresses, domain names were created.

Domain names consist of two or more parts, frequently words, separated by periods. Since the words, numbers, or other symbols forming a domain name often indicate or at least suggest the identity of a destination and are more easily remembered than the IP address, domain names have become the standard way of entering an address.

After a domain name has been entered, a domain name server (DNS) resolves the domain name into a specific IP address. Thus, for example, when someone surfing the Internet enters into a browser program a particular domain name for a web site, the browser first queries the DNS to arrive at the proper IP address.

While the IP address works well to deliver packets to the correct address on the Internet, IP addresses do not convey any useful information about the geographic address of the destination. Furthermore, the domain names do not even necessarily indicate any geographic location, though sometimes they may suggest, correctly or incorrectly, such a location.

Systems have been developed that enable entities, such as advertising networks, web publishers, search engines, social networks, e-tailers, and/or the like, who find it useful to know a user's geographic location, to derive the user's location from his/her IP address. These entities may then use this information for a variety of applications including, for example, delivering geo-targeted advertisements, localizing online storefronts, controlling the distribution of online content or goods, and/or the like. An example of such a system is that described in U.S. Pat. No. 6,757,740, entitled "Systems and Methods for Determining Collecting and Using Geographic Locations of Internet Users" ("the '740 patent"), which is commonly assigned to the assignee of the present application, and which is incorporated herein by reference in its entirety. The techniques of the '740 patent are discussed in more detail below.

As marketers and other entities continue to embrace the value that IP intelligence (i.e., geographic information derived from IP addresses) brings to online endeavors, however, they are also demanding more granularity. In particular, while country-level location information may have been sufficient before, greater depth and accuracy of location information is gradually becoming more and more desired in order to enable companies to build a true one-to-one relationship with a growing online audience.

This desire for more granular and accurate geographic location information associated with users is countered, however, by the privacy concerns of those users who may not want their name and address linked to their IP address and subsequently used, for example, for advertising purposes. In fact, communication of such user-specific information may violate various privacy laws in place in different countries.

A need, therefore, exists for a technique for obtaining more specific geographic information associated with an IP address without violating any privacy issues.

BRIEF SUMMARY

In general, embodiments of the present invention provide an improvement by, among other things, providing a method, computer program product, system and electronic device for providing hyper-local (e.g., zip code level) geo-targeting based on validated, user-provided geographic information, wherein the user's anonymity may be maintained. In particular, according to one embodiment, anonymous, user-supplied geographic information may be collected in association with a truncated IP address (e.g., the first three octets of a complete IP address). Since a complete IP address is not used, the user-supplied geographic information cannot be linked to a specific user. Instead, the information supplied could apply to any one of 255 different users having the same truncated IP address. As a result, according to embodiments of the present invention, a user's anonymity may be maintained.

Once collected, the user-supplied information may be validated using geographic data previously derived from one or more complete IP addresses corresponding to the received truncated IP address (e.g., IP addresses having the same first three octets). In one embodiment, this geographic data may, for example, have been derived using a system that maps the routing infrastructure of the Internet in order to determine where endpoints on the Internet are located.

The derived geographic data, while useful, may not be as specific as the user-supplied geographic information. For example, the derived geographic data may only indicate a city or state associated with the IP address, while the user-supplied geographic information may include a postal or zip code. As a result, once the user-supplied geographic information has been validated, according to embodiments of the present invention, this validated, user-supplied geographic information may be used to provide more granular and accurate geo-targeting, all the while maintaining the privacy of the individual users.

In accordance with one aspect, a method is provided of hyper-local geo-targeting based on validated, user-provided geographic information, wherein the user's anonymity may be maintained. In one embodiment, the method may include: (1) receiving, by a computer over a network, a truncated IP address associated with a user; (2) receiving, by the computer, user-supplied geographic information associated with the truncated IP address; (3) retrieving, by the computer from a database, geographic data derived from one or more complete IP addresses corresponding to the truncated IP address; and (4) validating, by the computer, the user-supplied geographic information based at least in part on the derived geographic data, wherein, once validated, the user-supplied geographic information can be used to provide geo-targeted information.

According to another aspect, an electronic device is provided for hyper-local geo-targeting based on validated, user-provided geographic information. In one embodiment, the electronic device may include a processor configured to: (1) receive a truncated IP address associated with a user; (2) receive user-supplied geographic information associated with the truncated IP address; (3) retrieve, from a database, geographic data derived from one or more complete IP addresses corresponding to the truncated IP address; and (4) validate the user-supplied geographic information based at least in part on the derived geographic data, wherein, once validated, the user-supplied geographic information can be used to provide geo-targeted information.

In accordance with yet another aspect, a computer program product is provided for hyper-local geo-targeting based on validated, user-provided geographic information. The computer program product contains at least one computer-readable storage medium having computer-readable program code portions stored therein. The computer-readable program code portions of one embodiment may include: (1) a first executable portion for receiving a truncated IP address associated with a user; (2) a second executable portion for receiving user-supplied geographic information associated with the truncated IP address; (3) a third executable portion for retrieving, from a database, geographic data derived from one or more complete IP addresses corresponding to the truncated IP address; and (4) a fourth executable portion for validating the user-supplied geographic information based at least in part on the derived geographic data, wherein, once validated, the user-supplied geographic information can be used to provide geo-targeted information.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Figure 1:
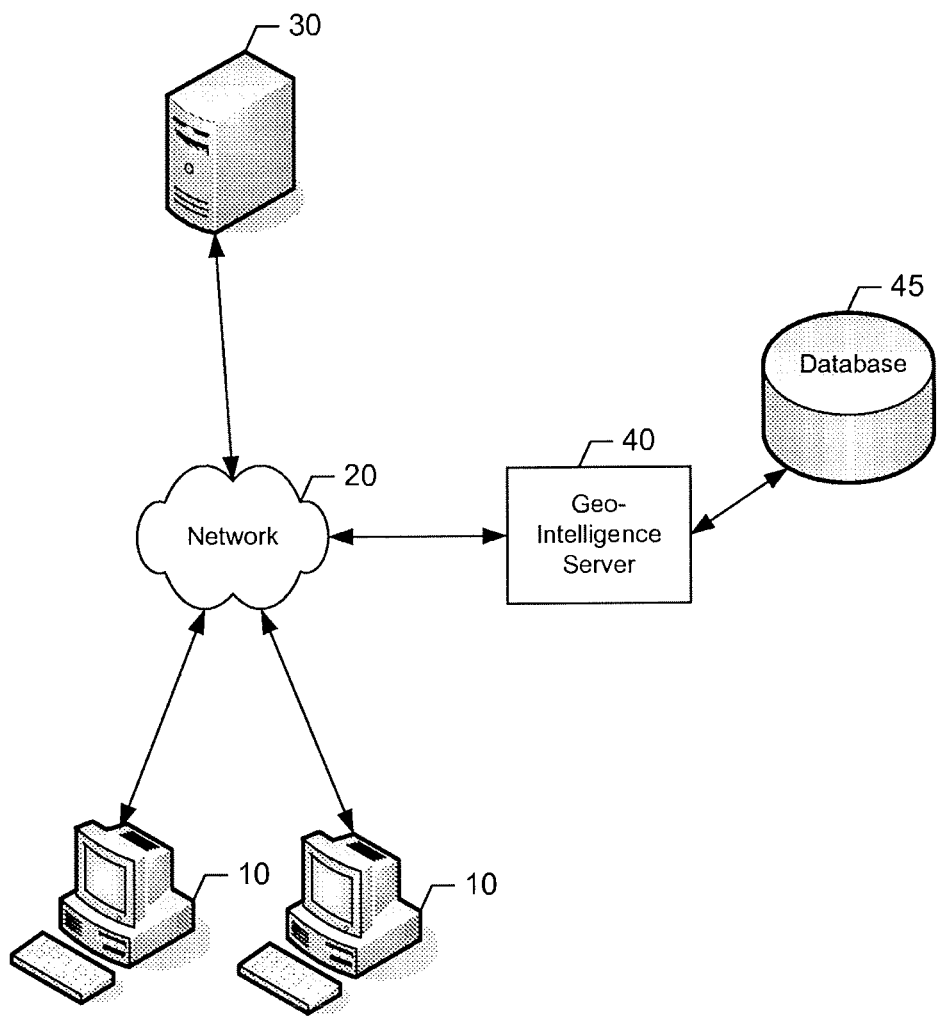
FIG. 1 is a block diagram of one type of system that would benefit from embodiments of the present invention.

Overall System and Mobile Device:

Referring to FIG. 1, an illustration of one type of system that may benefit from embodiments of the present invention is provided. As shown in FIG. 1, the system may include one or more user devices 10 (e.g., personal computers (PC's), laptops, personal digital assistants (PDA's), etc.) in communication with a network server 30 over a communication network 20 (e.g., wired or wireless personal area network (PAN), local area network (LAN), wide area network (WAN), etc.) for the purpose of conducting an online transaction in association with which the user provides some geographic information (e.g., city, state, zip code, etc.). For example, a user may use his or her computer 10 to purchase an item on eBay®, wherein the user's address is transmitted to a server 30 associated with eBay for the purpose of account verification, payment and/or shipping.

The system may further include a geo-intelligence server 40, and corresponding database 45, in communication with the network server 30 over the same or different communications network 20. In one embodiment, as discussed in more detail below with regard to FIG. 3, the geo-intelligence server 40 may be configured to receive the user-supplied geographic information along with a truncated IP address associated with the user (e.g., the first three octets of a complete IP address) from the network server 30, validate the user-supplied geographic information using geographic data previously derived from IP addresses corresponding to the truncated IP address received, and then use the user-supplied geographic information for subsequent geo-targeting.

Figure 2:
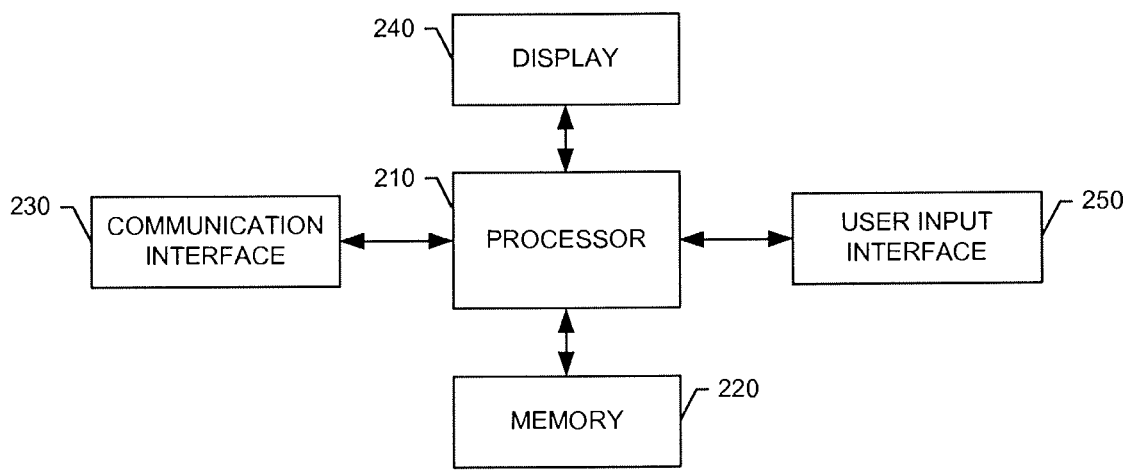
FIG. 2 is a schematic block diagram of an entity capable of operating as a Geo-Intelligence server in accordance with embodiments of the present invention.

Referring now to FIG. 2, a block diagram of an entity capable of operating as a geo-intelligence server 40 is shown in accordance with one embodiment of the present invention. The entity capable of operating as a geo-intelligence server 40 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a geo-intelligence server 40 can generally include means, such as a processor 210 for performing or controlling the various functions of the entity.

In particular, the processor 210 may be configured to perform the processes discussed in more detail below with regard to FIG. 3. For example, according to one embodiment the processor 210 may be configured to receive a truncated IP address along with user-supplied geographic information associated with a user. The processor 210 may further be configured to retrieve geographic data derived from one or more complete IP addresses corresponding to the truncated IP address received, and to use the derived geographic data to validate the user-supplied geographic information. Once validated, the processor 210 may further be configured to store the user-supplied geographic information in the database 45 in association with the complete IP addresses for which the user-supplied geographic information has been validated (i.e., in replacement of the derived geographic data previously associated with those IP addresses). The processor 210 may subsequently use the user-supplied geographic information to provide geo-targeted information in response to requests received in association with those complete IP addresses.

In one embodiment, the processor is in communication with or includes memory 220, such as volatile and/or non-volatile memory that stores content, data or the like. For example, the memory 220 may store content transmitted from, and/or received by, the entity. Also for example, the memory 220 may store software applications, instructions or the like for the processor to perform steps associated with operation of the entity in accordance with embodiments of the present invention. In particular, the memory 220 may store software applications, instructions or the like for the processor to perform the operations described above and below with regard to FIG. 3 for providing hyper-local geo-targeting based on validated, user-supplied geographic information.

For example, according to one embodiment, the memory 120 may store one or more modules for instructing the processor 210 to perform the operations including, for example, a user-information module, a derived-information module, a validation module, and a geo-targeting module. In one embodiment, the user-information module may be configured to instruct the processor 210 to receive the truncated IP address (e.g., 24.2.53.X) and user-supplied geographic information (e.g., zip code 30307) associated with a user. The derived-information module may be configured to then instruct the processor 210 to retrieve geographic data derived from one or more complete IP addresses corresponding to the truncated IP address received (e.g., 24.2.53.0-100, 24.2.53.210, etc.). In one embodiment, the derived-information module may further be configured to instruct the processor 210 to derive geographic data from one or more complete IP addresses, for example, in a manner described below involving mapping the routing infrastructure of the Internet.

Once the derived geographic data has been retrieved, the validation module may be configured to instruct the processor 210 to use the derived geographic data to validate the user-supplied geographic information. Finally, the geo-targeting module may be configured to instruct the processor 210 to store the validated user-supplied geographic information in the database 45 in association with the complete IP addresses for which the user-supplied geographic information has been validated, and then use the user-supplied geographic information to provide geo-targeted information in response to requests received in association with those complete IP addresses.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

While the foregoing description refers to a geo-intelligence "server," as one of ordinary skill in the art will recognize in light of this disclosure, embodiments of the present invention are not limited to a server-client architecture. Instead, the geo-intelligence "server" may comprise any electronic device capable of performing the functionality described herein. Similarly, as one of ordinary skill in the art will recognize in light of this disclosure, the functionality described herein as being performed by the geo-intelligence server may be performed by a single, or multiple electronic devices or entities operating alone or in association with one another.

Method of Providing Hyper-Local Geo-Targeting

Figure 3:
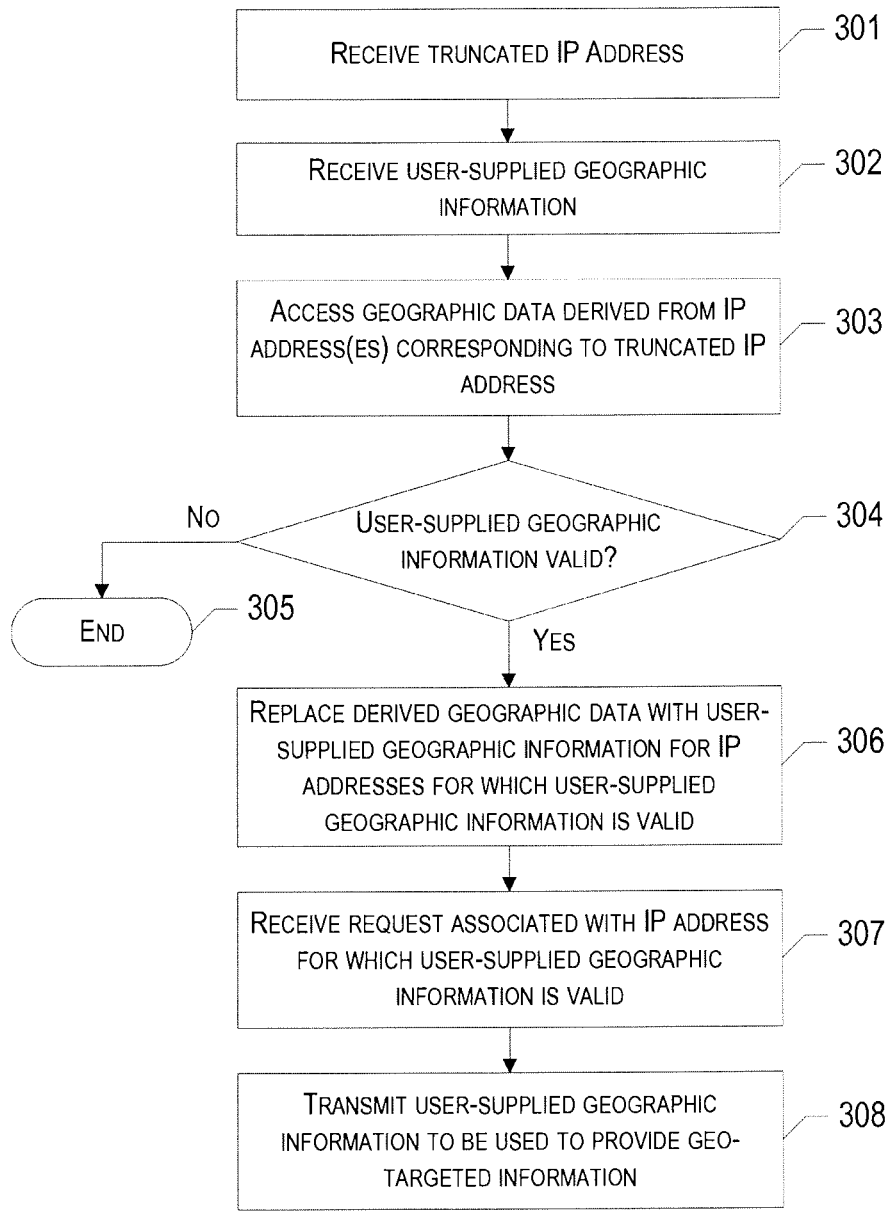
FIG. 3 is a flow chart illustrating the process of providing hyper-local geo-targeting based on validated, user-supplied geographic information in accordance with embodiments of the present invention.

Referring now to FIG. 3, the operations are illustrated that may be taken in order to provide hyper-local (e.g., zip code level) geo-targeting based on validated, user-supplied geographic information, wherein the user's anonymity may be maintained. As shown, the process may begin at Blocks 301 and 302 when the geo-intelligence server 40 (e.g., a processor, or similar computing device, associated with the server and executing, for example, the user-information module) receives a truncated IP address and user-supplied geographic information associated with a user.

In one embodiment, the truncated IP address and user-supplied geographic information may be received, for example, from a network server 30, or similar device, associated with any company or entity that conducts online transactions with a user whereby the user provides some location information. For example, a company, such as eBay®, Yahoo®, AOL®, and/or the like, may receive address or location information from a user for the purpose of establishing or verifying an account, billing for products or services purchased, providing delivery information for a product purchased, and/or the like. The address or location information may include, for example, the user's street address, city, state and/or zip code (e.g., 664 N. Highland Avenue NE; Atlanta, Ga. 30307). According to embodiments of the present invention, the company may, thereafter, transmit the user-supplied geographic information, along with a truncated IP address associated with the user, to the geo-intelligence server 40.

In one embodiment, the truncated IP address may include the first three octets of a complete IP address associated with the user, wherein the complete IP address has four octets. To illustrate, an example of a truncated IP address may be 24.2.53.X, where the complete IP addresses that correspond to that truncated IP address include any IP address having the same first three octets (i.e., IP addresses 24.2.53.0 to 24.2.53.255). Because the truncated IP address could correspond to any one of 255 different IP addresses having the same first three octets and, therefore, any one of up to 255 different users, a user cannot be specifically identified by the truncated IP address. As a result, by transmitting only a truncated IP address (as opposed to the complete IP address associated with the user), embodiments of the present invention maintain the user's anonymity and avoid any privacy issues associated with transmitting user-specific information.

Once the truncated IP address and user-supplied geographic information have been received, according to one embodiment, the geo-intelligence server 40 (e.g., a processor, or similar computing device, associated with the server and executing, for example, the derived-information module) may, at Block 303, access a database 45 to retrieve geographic data that has been derived from one or more complete IP addresses corresponding to the received truncated IP address. In other words, the geo-intelligence server 40 may retrieve any geographic data derived from a complete IP address having the same first three octets as the received truncated IP address. Continuing with the example above, upon receipt of the truncated IP address 24.2.53.X, the geo-intelligence server 40 may access the database 45 to retrieve any geographic data that has been derived from any one or more of the complete IP addresses ranging from 24.2.53.0 to 24.2.53.255.

According to one embodiment, the geographic data may have been derived from the complete IP address in a manner similar to that described in U.S. Pat. No. 6,757,740, entitled "Systems and Methods for Determining Collecting and Using Geographic Locations of Internet Users" ("the '740 patent"). In general, according to one of the methods described in the '740 patent, the geo-intelligence server may use various Internet route tools to aid in discovering the likely placement of a newly discovered Internet host (i.e., a target host corresponding to an IP address). These tools may include, for example, programs such as nslookup, ping, traceroute, and whois.

Figure 4:
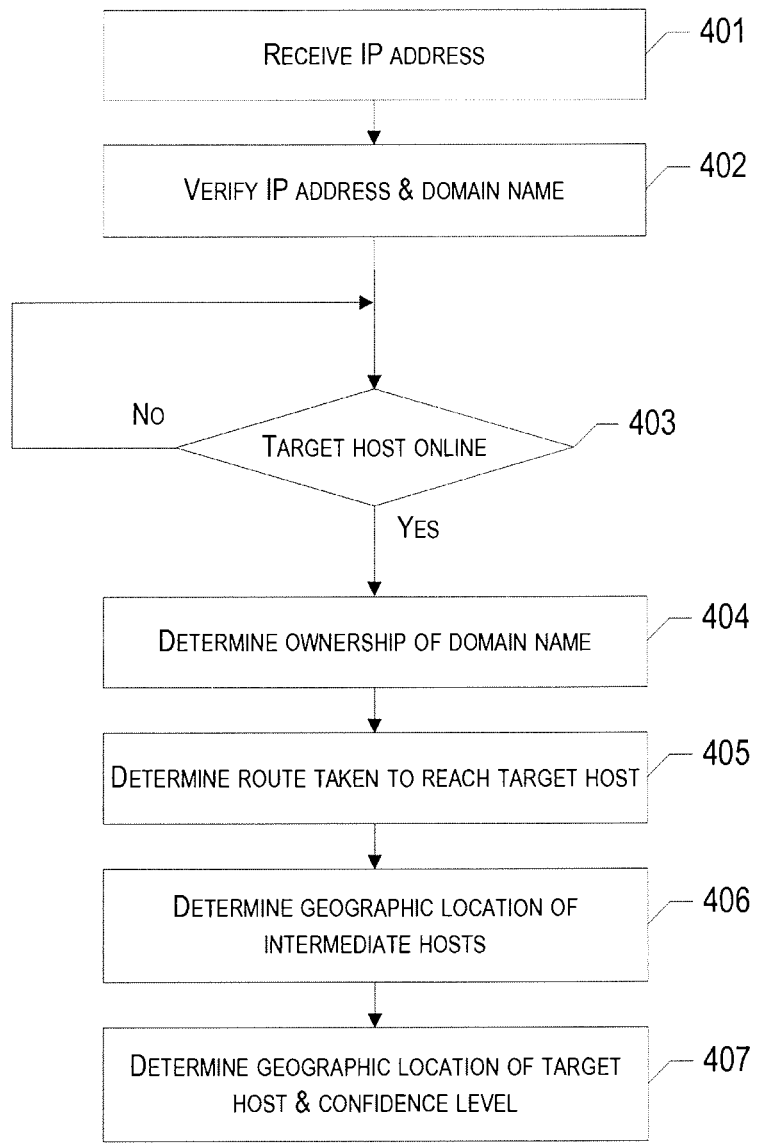
FIG. 4 is a flow chart illustrating the process of deriving geographic data from an IP address in accordance with embodiments of the present invention.

In particular, according to one embodiment, the following process, which is also shown in FIG. 4, may be used in order to derive geographic data from a complete IP address associated with a target host. First, the geo-intelligence server may receive a new IP address, for which geographic data is desired. (Block 401). Upon receipt, the IP address and, in one embodiment, a domain name associated with the IP address may be verified using, for example, nslookup. (Block 402). As one of ordinary skill in the art will recognize in light of this disclosure, in order to verify an IP address and/or domain name, nslookup converts IP addresses to domain names, and vice versa, using the Domain Name Server (DNS) lookup system.

Once verified, the geo-intelligence server may, at Block 403, determine whether the target host is online and operational by sending a request to the target host using, for example, ping. If it is determined that the target host is not online, according to one embodiment, the process may continue to check until the host is online and operational. Once online and operational, the geo-intelligence server may, at Block 404, determine the ownership of the domain name and/or IP address associated with the target host. In one embodiment, this may be done using, for example, whois. In particular, according to one embodiment, whois may query one or more servers on the Internet to obtain registration information, including a geographic address, for the domain name and/or a block of IP addresses including the target host IP address. While the geographic address included in the registration information may not necessarily be the location of the IP address, this information may be useful for smaller organizations whose IP blocks are often geographically in one location (i.e., small whois block, discussed below).

The geo-intelligence server may then, at Block 405, determine the route taken to reach the target host. In particular, according to one embodiment, the geo-intelligence server may use traceroute, which may provide the IP address and domain name for each host encountered from the source host to the target host, wherein the source host corresponds to the geo-intelligence server.

Once each of the intermediate hosts has been identified (at Block 405), the geo-intelligence server may, at Block 406, determine the geographic location associated with each of those intermediate hosts, as well as the confidence level (e.g., between 0 and 100) assigned to that geographic location. This may involve, for example, accessing a database to retrieve previously derived geographic data and confidence information associated with the intermediate host. If, however, the geographic location of an intermediate host is unknown, the location may be derived, and a confidence level assigned, using, for example, the technique described below with regard to Block 407.

Once the geographic location of each intermediate host has been determined, the geo-intelligence server may, at Block 407, determine the location of the target host and assign a confidence level to that determination based at least in part on the locations of the intermediate hosts and the confidence level associated with those locations. All new hosts (intermediate and target) and their corresponding geographic data may then be added to the database. In particular, in one embodiment, once the geographic data has been derived from a complete IP address, or range of complete IP addresses, the geographic data may be stored in the database 45 in association with the corresponding IP address(es). For example, the database may store an entry that links "Atlanta" to the IP addresses ranging from 24.2.53.0 to 24.2.53.100, along with another entry that links "San Francisco" to the IP addresses ranging from 24.2.53.101 to 24.2.53.255. It is the information in these entries (i.e., "Atlanta" and "San Francisco") that the geo-intelligence server 40 may retrieve at Block 303 in response to receiving the truncated IP address 24.2.53.X.

According to embodiments described herein, in order to derive the geographic data from a received IP address, in addition to using the geographic location of the intermediate hosts in the route associated with the target host, a combination of several different factors may be used to determine the geographic location of the target, as well as to assign a confidence level to that geographic location. For example, according to one embodiment, the whois registration information (i.e., the address information provided by the domain name/IP address registrant) may be used to help determine the geographic location, though the confidence level associated with the determined location may be relatively low (e.g., 35). Alternatively, or in addition, mapping information provided by an Internet Service Provider (ISP) in association with an IP address may further be used.

In one embodiment, the geographic information associated with neighboring IP addresses may likewise be used. For example, if the database 45 includes geographic information for IP addresses immediately before and/or after the complete IP address, it may be assumed that the IP address has the same, or similar, geographic location.

In addition, the geo-intelligence server 40 may take advantage of common naming conventions in order to make reasonable guesses as to the geographic locations of the hosts. For example, any host that contains "sanjose" in the first part of its domain name is probably located in San Jose, Calif. or connected to a system that is in San Jose, Calif. In one embodiment, the database 45 may have lookup tables that list geographic locations, such as city, county, regional, state, and/or the like, with corresponding variations of the names. For example, the database 45 may have multiple listings for San Francisco, Calif. including, for example, "SanFrancisco," "SanFran," "Sfrancisco," and/or the like. The geo-intelligence server 40 may access the database to retrieve any geographic location information associated with at least part of the domain name and use this to make a guess as to the geographic location of the target host.

As an example, a sample search to determine the geographic location of the domain name "digitalenvoy.net" will now be described. First, the geo-intelligence server 40 may receive the domain name "digitalenvoy.net" associated with the target host (Block 401) and perform a DNS lookup on the name (Block 402). In response, the command nslookup may return the following to the geo-intelligence server 40:
nslookup digitalenvoy.net
Name: digitalenvoy.net
Address: 209.153.199.15

The geo-intelligence server 40 may then, at Block 403, perform a ping on the target host machine, which may tell the geo-intelligence server 40 if the target host is on-line and operational. In this example, the ping may return the following to the geo-intelligence server 40, indicating that the target host is online and operational:

```
ping -c 1 digitalenvoy.net
PING digitalenvoy.net (209.153.199.15): 56 data bytes
64 bytes from 209.153.199.15: icmp_seq=0 ttl=241 time=120.4 ms
--- digitalenvoy.net ping statistics ---
1 packets transmitted, 1 packets received, 0% packet loss
round-trip min/avg/max = 120.4/120.4/120.4 ms
```

Continuing with FIG. 4, the geo-intelligence server 40 may then execute a whois on "digitalenvoy.net" to determine ownership of the domain name. (Block 404). In this example, the whois may inform the geo-intelligence server 40 that the registrant is in Georgia.

```
> whois digitalenvoy.net
Registrant:
Some One (DIGITALENVOY-DOM)
    1234 Address Street
    ATLANTA, GA 33333
    US
    Domain Name: DIGITALENVOY.NET
    Administrative Contact:
        One, Some (SO0000) some@one.net
        +1 404 555 5555
    Technical Contact, Zone Contact:
        myDNS Support (M5311-ORG) support@MYDNS.COM
        +1 (206) 374.2143
    Billing Contact:
        One, Some (SO0000) some@one.net
        +1 404 555 5555
    Record last updated on 14-Apr-99.
    Record created on 14-Apr-99.
    Database last updated on 22-Apr-99 11:06:22 EDT.
    Domain servers in listed order:
    NS1.MYDOMAIN.COM      209.153.199.2
    NS2.MYDOMAIN.COM      209.153.199.3
    NS3.MYDOMAIN.COM      209.153.199.4
    NS4.MYDOMAIN.COM      209.153.199.5
```

The geo-intelligence server 40 may then execute a traceroute on the target host to determine the route taken to reach the target host. (Block 405). In this example, the traceroute on "digitalenvoy.net" may return the following to the gco-intelligence server 40:

```
> traceroute digitalenvoy.net
traceroute to digitalenvoy.net (209.153.199.15), 30 hops max, 40 byte packets
    1 130.207.47.1 (130.207.47.1) 6.269 ms 2.287 ms 4.027 ms
    2 gateway1-rtr.gatcch.edu (130.207.244.1) 1.703 ms 1.672 ms 1.928 ms
    3 fl -0.atlanta2-cr99.bbnplanet.net (192.221.26.2) 3.296 ms 3.051 ms 2.910 ms
    4 fl -0.atlanta2-br2.bbnplanet.net (4.0.2.90) 3.000 ms 3.617 ms 3.632 ms
    5 s4-0-0.atlanta1-br2.bbnplanet.net (4.0.1.149) 4.076 ms s8-1-0.atlanta1-
br2.bbnplanet.net
(4.0.2.157) 4.761 ms 4.740 ms
    6 h5-1-0.paloalto-br2.bbnplanct.nct (4.0.3.142) 72.385 ms 71.635 ms 69.482 ms
    7 p2-0.paloalto-nbr2.bbnplanet.net (4.0.2.197) 82.580 ms 83.476 ms 82.987 ms
    8 p4-0.sanjose1-nbr1.bbnplanetnet (4.0.1.2) 79.299 ms 78.139 ms 80.416 ms
    9 p1-0-0.sanjose1-br2.bbnplanet.net (4.0.1.82) 78.918 ms 78.406 ms 79.217 ms
    10 NSanjose-core0.nap.net (207.112.242.253) 80.031 ms 78.506 ms 122.622 ms
    11 NSeattle1-core0.nap.net (207.112.247.138) 115.104 ms 112.868 ms 114.678 ms
    12 sea-atm0.starcom-accesspoint.net (207.112.243.254) 112.639 ms 327.223 ms 173.847
ms
    13 van-atm10.10.starcom.net (209.153.195.49) 118.899 ms 116.603 ms 114.036 ms
    14 hume.worldway.net (209.153.199.15) 118.098 ms * 114.571 ms
```

The geo-intelligence server 40 may, at Block 406, determine the geographic locations of each of the intermediate hosts in the determined route, as well as a confidence level associated with each of those geographic locations. As discussed above, in one embodiment, this may involve accessing the database 45 to retrieve the previously derived geographic location information for each intermediate host. Using this information, as well as other factors (e.g., the whois registration information, naming conventions, etc.), the geo-intelligence server 40 may, at Block 407, determine the geographic location of the target host, and a confidence level associated therewith. The following provides an example of the geographic information and confidence level for the intermediate and target hosts according to this example:

| | |
|---|---|
| 130.207.47.1 (130.207.47.1) | Host machine located in Atlanta, GA |
| gateway1-rtr.gatech.edu (130.207.244.1) | Atlanta, GA - confidence 100 |
| f1-0.atlanta2-cr99.bbnplanet.net (192.221.26.2) | Atlanta, GA - confidence 100 |
| f1-0.atlanta2-br2.bbnplanct.net (4.0.2.90) | Atlanta, GA - confidence 95 |
| s4-0-0.atlanta1-br2.bbnplanet.net (4.0.1.149) | Atlanta, GA - confidence 80 |
| h5-1-0.paloalto-br2.bbnplanet.net (4.0.3.142) | Palo Alto, CA - confidence 85 |
| p2-0.paloalto-nbr2.bbnplanet.net (4.0.2.197) | Palo Alto, CA - confidence 90 |
| p4-0.sanjose1-nbr1.bbnplanet.net (4.0.1.2) | San Jose, CA - confidence 85 |
| p1-0-0.sanjose1-br2.bbnplanet.net (4.0.1.82) | San Jose, CA - confidence 100 |
| NSanjose-core0.nap.net (207.112.242.253) | San Jose, CA - confidence 90 |
| NSeattle1-core0.nap.net (207.112.247.138) | Seattle, WA - confidence 95 |
| sea-atm0.starcom-accesspoint.net (207.112.243.254) | Seattle, WS - confidence 95 |
| van-atm10.10.starcom.net (209.153.195.49) | Vancouver, British Columbia Canada - confidence 100 |
| hume.worldway.net (209.153.199.15) | Vancouver, British Columbia Canada |

Returning to FIG. 3, once geographic data derived from one or more complete IP addresses corresponding to the received truncated IP address (e.g., in the manner described above) have been retrieved from the database 45, the geo-intelligence server 40 (e.g., a processor, or similar computing device, associated with the server and executing, for example, the validation module) may, at Block 304, use the derived geographic data to determine whether the user-supplied geographic information is valid.

In one embodiment, the user-supplied geographic information may be considered valid if it is the same or equivalent to the geographic data derived from at least one complete IP address corresponding to the truncated IP address, wherein the user-supplied geographic information may be considered the same or equivalent to the derived geographic data if both identify or correspond to the same, or substantially the same, geographic location. For example, if, as in the example above, the user-supplied geographic information associated with the truncated IP address 24.2.53.X included the zip code 30307, and the geographic data derived from the IP address range 24.2.53.0-24.2.53.100 was Atlanta, then, according to one embodiment, the user-supplied geographic information (i.e., 30307) would be considered valid for the IP address range 24.2.53.0-24.2.53.100, since 30307 is a zip code in Atlanta. As one of ordinary skill in the art will recognize in light of this disclosure, the user-supplied geographic information may be valid for any number and combination of IP addresses within the range of IP addresses corresponding to the truncated IP address.

According to one embodiment, a number of different rules may be applied in order to determine whether the user-supplied geographic information is valid. For example, the validity of the user-supplied geographic information may depend upon the number of complete IP addresses for which the derived geographic data is the same or equivalent to the user-supplied geographic information (e.g., if >25 complete IP addresses with the same or equivalent derived geographic data, then valid). Alternatively, or in addition, validity may depend upon the number of consistent user-supplied geographic information received for the same truncated IP address (e.g., if >25 user's provide same city or zip code for same truncated IP address, then valid), the reliability of the sources of the user-supplied geographic information, and/or the age of the user-supplied geographic information (e.g., if >1 year old, then invalid).

As one of ordinary skill in the art will recognize in light of this disclosure, the foregoing provides only a few examples of rules that may be applied in order to determine whether user-supplied geographic information is valid based on geographic data derived from corresponding IP addresses. Other similar rules may likewise be used in combination with or instead of the rules provided herein. The foregoing is, therefore, provided for exemplary purposes only and should not be taken in any way as limiting embodiments of the present invention to the examples provided.

If it is determined, at Block 304, that the user-supplied geographic information is not valid for any IP address that corresponds to the truncated IP address received, then the process ends. (Block 305). If, on the other hand, it is determined that the user-supplied geographic information is valid for at least one complete IP address, then the geo-intelligence server 40 (e.g., a processor, or similar computing device, associated with the server) may, at Block 306, update the database 45 by replacing the geographic data derived from that at least one complete IP address with the user-supplied geographic information. Continuing with the example above, the database 45 may be updated to replace the geographic data derived from IP address range 24.2.53.0-24.2.53.100 (i.e., Atlanta) with the more specific user-supplied geographic information (i.e., zip code 30307).

In one embodiment, there may be certain instances where the derived geographic data may be considered more reliable and/or accurate than the user-supplied geographic information, despite the user-supplied geographic information having been validated. For example, if the derived geographic data is based on the geographic address, including a zip code, provided by a company having registered a small range of IP addresses (e.g., <255) (i.e., a small whois range), the geographic address provided may be assumed to be valid for that range of IP addresses, since it is likely that the company only has one office corresponding to the geographic address provided. Because the geographic address is assumed valid, and is likely as specific as the user-supplied geographic information, it may be unnecessary to replace the geographic address with the user-supplied geographic information. This is in contrast to a company that registers a large range of IP addresses (e.g., >255) using the same geographic address. Because the company likely has multiple different offices at multiple different locations, the geographic address provided cannot be assumed to correspond to each of the registered IP addresses. Accordingly, the validated user-supplied geographic information may be used in this instance.

According to embodiments described herein, a similar decision not to replace the derived geographic data with the validated user-supplied geographic information may be made if, for example, the derived geographic data has been confirmed by a person and/or is based on automated modem calls into an Internet Service Provider (ISP) pop, wherein it is determined what IP's are allocated to the pop.

Other instances in which the user-supplied geographic information may not be used may include, for example, when a satellite connection has been used by the user (since the user-supplied geographic information is likely inaccurate), when the derived geographic data includes multiple best guest cities and/or host match cities in the range of IP addresses corresponding to the truncated IP address (i.e., using a point higher up in a trace route to determine user location when there is no other information closer to the end user), and/or when the user-supplied geographic information identifies a city (e.g., Atlanta), and the derived geographic data identifies a suburb of that city (e.g., Dunwoody) (since the suburb is likely more accurate).

According to one embodiment, the validated, user-supplied information, which, in one embodiment, may be more specific than the derived geographic data, may thereafter be used to provide hyper-local geo-targeting information. In particular, in one embodiment, the geo-intelligence server 40 (e.g., processor, or similar computing means, associated with the server and executing a geo-targeting module) may, at Block 307, receive a request for geographic information associated with a complete IP address for which the user-supplied geographic information has been validated and saved in the database 45 (e.g., 24.2.53.74). In one embodiment, the request may be received from a web server associated with a web site being accessed by a user, wherein the web server wishes to provide geo-targeted content (e.g., advertisements).

In response, the geo-intelligence server 40 (e.g., processor, or similar computing means, associated with the server and executing a geo-targeting module) may, at Block 308, provide the user-supplied geographic information stored in the database 45, such that this information may be used to provide geo-targeted information to the user. For example, as noted above, the geographic location information may be used, for example, by advertising networks, web publishers, search engines, social networks, e-tailers, and/or the like, who may use this information for a variety of applications including, for example, delivering geo-targeted advertisements, localizing online storefronts, controlling the distribution of online content or goods, and/or the like Conclusion:

As described above, embodiments of the present invention provide a method and system for providing hyper-local (e.g., zip code level) geo-targeting based on validated, user-supplied geographic information, wherein the user's anonymity may be maintained.

As described above and as will be appreciated by one skilled in the art, embodiments of the present invention may be configured as a method or device. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 210 discussed above with reference to FIG. 2, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 210 of FIG. 2) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for providing hyper-local geo-targeting information, the method comprising:
    receiving, by a computer (geo-intelligence server) over a network from a network server, a user Internet Protocol (IP) address, wherein the user IP address is associated with a user device associated with a user, wherein the user IP address is received while maintaining the anonymity of the user;
    receiving, by the computer from the network server, anonymous user-supplied geographic information associated with the user IP address, wherein the user supplies the anonymous user-supplied geographic information to the network server via the user device;
    associating at least one stored IP address with the user IP address, wherein the at least one stored IP address is not the same as the user IP address;
    retrieving, by the computer from a database, stored geographic data corresponding to the at least one stored IP address;
    validating, by the computer, the anonymous user-supplied geographic information, the user-supplied geographic information associated with the user IP address, based at least in part on the stored geographic data associated with the at least one stored IP address; and
    providing the anonymous user-supplied geographic information as the hyper-local geo-targeted information once the user-supplied geographic information is validated.

2. The method of claim 1, wherein the anonymous user-supplied geographic information comprises a postal code associated with the user.

3. The method of claim 1, comprising the initial steps of:
    deriving geographic data from the at least one stored IP address; and
    storing the derived geographic data in the database in association with the corresponding IP address.

4. The method of claim 3, wherein the derived geographic data corresponding to the at least one stored IP address is generated by:
    identifying, for a respective IP address, one or more intermediate hosts between a source host and a target host associated with the respective IP address;
    determining a geographic location associated with respective intermediate hosts; and
    determining a geographic location of the target host based at least in part on the geographic location of respective intermediate hosts.

5. The method of claim 1, wherein validating the user-supplied geographic information further comprises:

determining whether the anonymous user-supplied geographic information is the same or equivalent to the stored geographic data associated with the at least one stored IP address.

6. The method of claim 5, wherein the anonymous user-supplied geographic information is the same or equivalent to the stored geographic data when the anonymous user-supplied geographic information and the stored geographic data correspond to the same or equivalent geographic location.

7. The method of claim 5 further comprising:
identifying the at least one stored IP address for which the stored geographic data is the same or equivalent to the anonymous user-supplied geographic information.

8. The method of claim 7 further comprising:
replacing the geographic data stored in the database in association with the at least one stored IP address with the anonymous user-supplied geographic information.

9. The method of claim 8 further comprising:
receiving, from a web server, a request for geographic information associated with the user IP address; and
transmitting, to the web server, the anonymous user-supplied geographic information, such that the web server can provide the hyper local geo-targeted information to a user associated with the user IP address.

10. The method of claim 1, wherein the user IP address is a truncated IP address.

11. The method of claim 1, wherein the stored geographic data comprises a confidence level.

12. A computer program product for providing hyper-local geo-targeting information, the computer program product comprising at least one non-transitory computer-readable storage medium having computer-readable program code portions stored therein, said non-transitory computer-readable program code portions comprising:
a first executable portion for receiving a user Internet Protocol (IP) address from a network server, wherein the user IP address is associated with a user, wherein the user IP address is received while maintaining the anonymity of the user;
a second executable portion for receiving anonymous user-supplied geographic information associated with the user IP address;
a third executable portion for associating at least one stored IP address associated with the user IP address, wherein the at least one stored IP address is not the same as the user IP address;
a fourth executable portion for retrieving, from a database, stored geographic data corresponding to the stored IP address; and
a fifth executable portion for validating the anonymous user-supplied geographic information, the user-supplied geographic information associated with the user IP address, based at least in part on the stored geographic data associated with the at least one stored IP address, and providing the anonymous user-supplied geographic information as the hyper-local geo-targeted information once the user-supplied geographic information is validated.

13. The computer program product of claim 12, wherein the anonymous user-supplied geographic information comprises a postal code associated with the user.

14. The computer program product of claim 12, wherein the non-transitory computer-readable program code portions further comprise:
a sixth executable portion for deriving geographic data from the at least one stored IP address; and
a seventh executable portion for storing the derived geographic data in the database in association with the corresponding at least one stored IP address.

15. The computer program product of claim 14, wherein the sixth executable portion is configured to:
identify, for the at least one stored IP address, one or more intermediate hosts between a source host and a target host associated with the at least one stored IP address;
determine a geographic location associated with respective intermediate hosts; and
determine a geographic location of the target host based at least in part on the geographic location of respective intermediate hosts.

16. The computer program product of claim 12, wherein the fourth executable portion is configured to:
determine whether the anonymous user-supplied geographic information is the same or equivalent to the stored geographic data associated with the at least one stored IP address.

17. The computer program product of claim 16, wherein the anonymous user-supplied geographic information is the same or equivalent to the stored geographic data when the anonymous user-supplied geographic information and the stored geographic data correspond to the same or equivalent geographic location.

18. The computer program product of claim 16, wherein the non-transitory computer-readable program code portions further comprise:
a sixth executable portion for identifying the at least one stored IP address for which the stored geographic data is the same or equivalent to the anonymous user-supplied geographic information.

19. The computer program product of claim 18, wherein the non-transitory computer-readable program code portions further comprise:
a seventh executable portion for replacing the stored geographic data stored in the database in association with the at least one stored IP address with the anonymous user-supplied geographic information.

20. The computer program product of claim 12, wherein the user IP address is a truncated IP address.

21. The computer program product of claim 12, wherein the stored geographic data comprises a confidence level.

22. An electronic device for providing hyper-local geo-targeting information, comprising:
a processor configured to:
receive a user Internet Protocol (IP) address from a network server, wherein the user IP address is associated with a user device associated with a user, wherein the user IP address is received while maintaining the anonymity of the user;
receive anonymous user-supplied geographic information associated with the user IP address, wherein the anonymous user-supplied geographic information is supplied to the network server by the user via the user device;
associating at least one stored IP address with the user IP address, wherein the at least one stored IP address is not the same as the user IP address;
retrieve, from a database, stored geographic data corresponding to the stored IP address;
validate the user-supplied geographic information, the user-supplied geographic information associated with the user IP address, based at least in part on the stored geographic data associated with the at least one stored IP address; and providing the anonymous user-supplied geographic information as the hyper-local geo-targeted information once the user-supplied geographic information is validated.

23. The electronic device of claim 22, wherein the user IP address is a truncated IP address.

24. The electronic device of claim 22, wherein the stored geographic data comprises a confidence level.

* * * * *